Aug. 4, 1942.  W. F. PECK ET AL  2,292,155
EYE TESTING INSTRUMENT
Filed Oct. 24, 1939  4 Sheets-Sheet 1
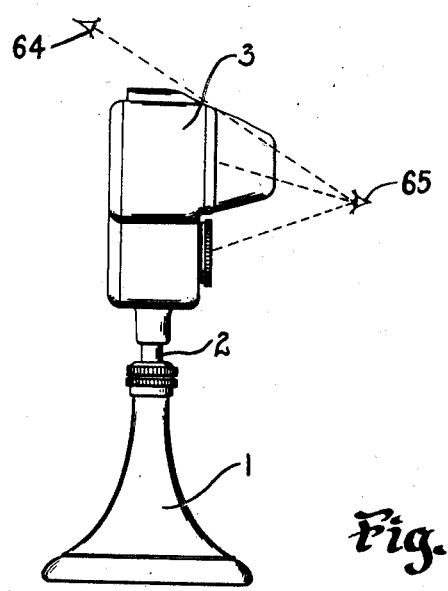
Fig. I
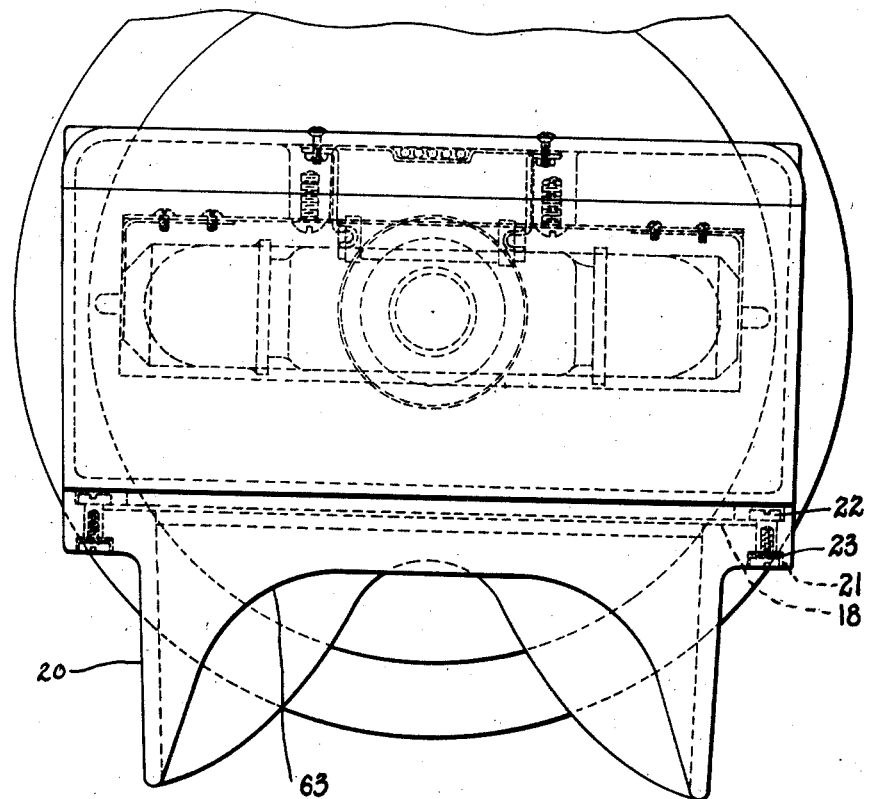
Fig. II
INVENTOR.
WILLIAM F. PECK
CHARLES M. SPERAZZ
BY Harry H. Styll
ATTORNEY.

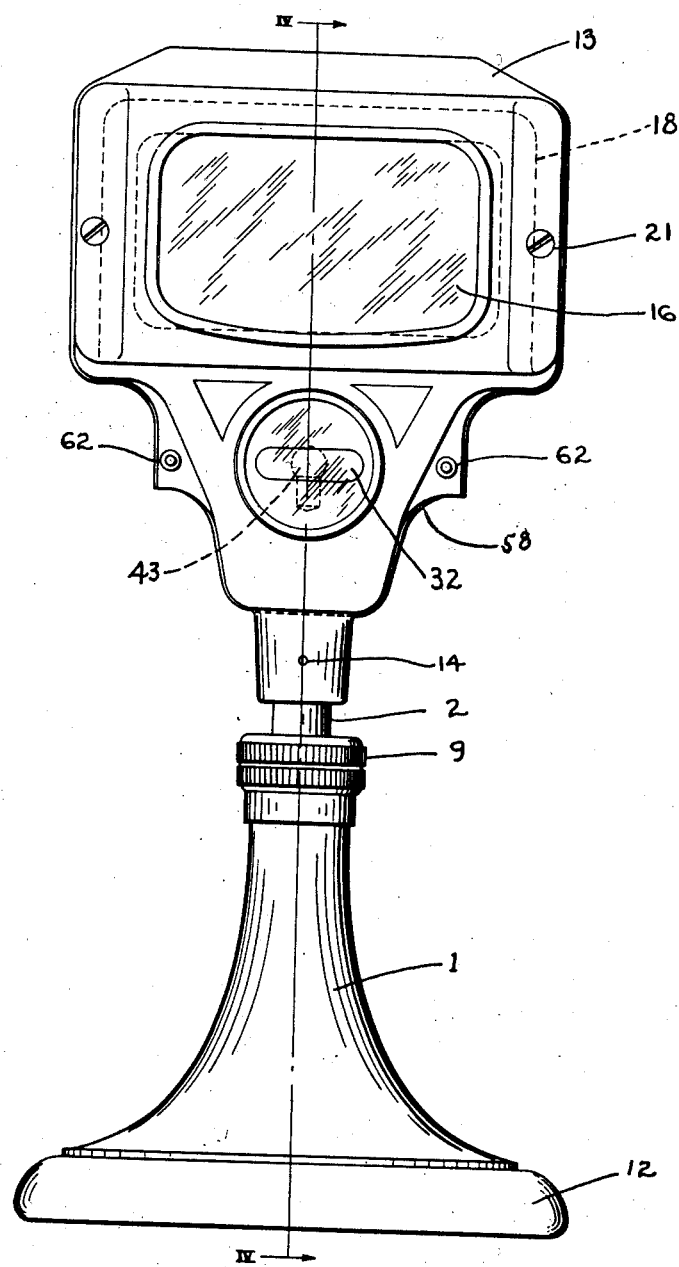

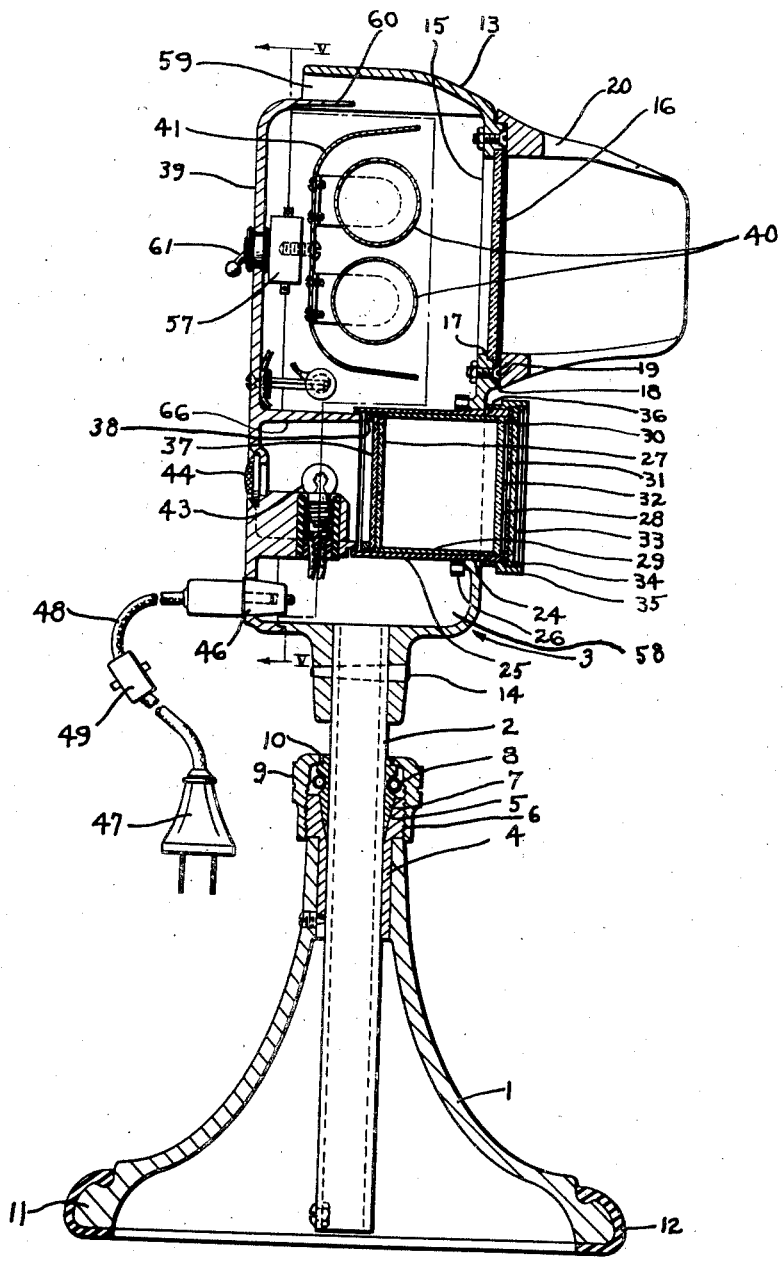

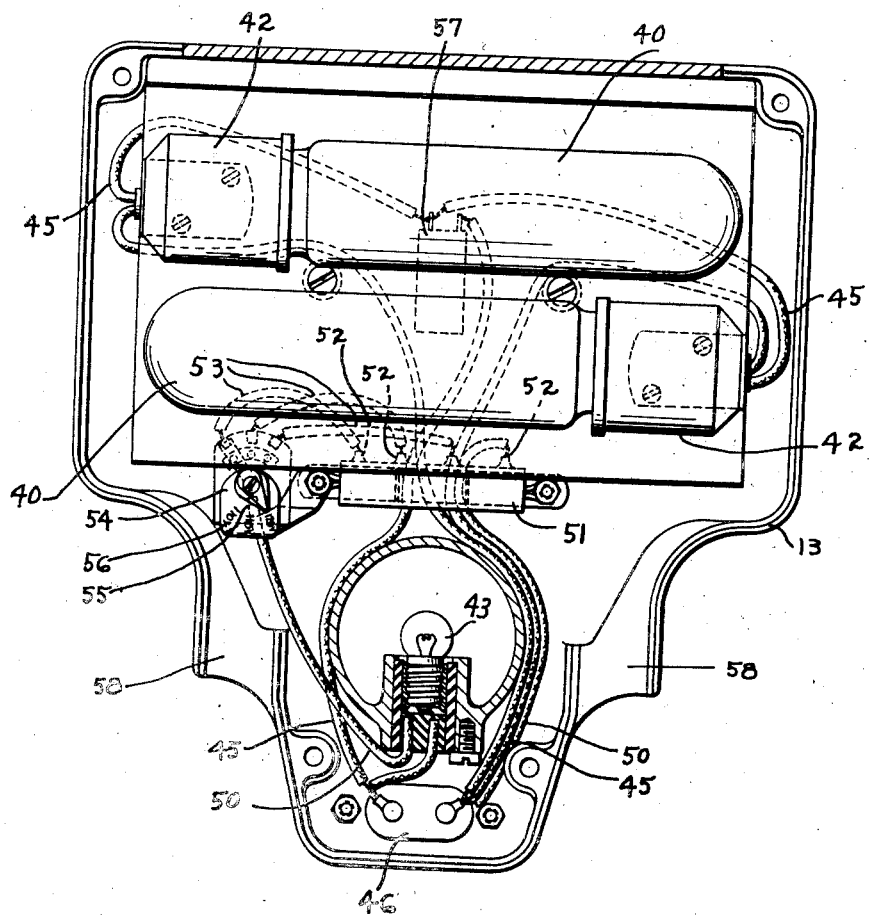
Fig. V

Patented Aug. 4, 1942

2,292,155

UNITED STATES PATENT OFFICE 2,292,155

EYE TESTING INSTRUMENT

William F. Peck and Charles M. Sperazz, Kenmore, N. Y., assignors to American Optical Company, Southbridge, Mass., a voluntary association of Massachusetts Application October 24, 1939, Serial No. 301,007

8 Claims. (Cl. 88—20)

This invention relates to improved means and method or process for testing eyes to determine the dark adaptation thereof and associated pathological conditions.

A principal object of this invention is to provide improved means and method or process for testing eyes to determine dark adaptation in a qualitative manner and to discover the existence and character of associated pathological conditions.

Another important object is to provide improved means and method for testing the eyes of an individual for night blindness by exposing the eye under test to a source of high intensity light for a given period of time according to said intensity to substantially bleach out the visual purple in the eye, and then exposing a low intensity source of illumination after shutting off the high intensity light and then determining the time required by the eye to see the low intensity souce of illumination by the recovery of the visual purple.

Another object is to provide improved means and method for testing the eyes of an individual for night blindness by subjecting the eye under test to a bright light for a specified period of time, according to the intensity of the light, setting a low intensity observation device having formed character in a selected position, shutting off the bright light and noting the time required for the patient to observe said low intensity observation device and report its position from the time the bright light was shut off.

Another object is to provide improved means and method or process for testing eyes through which the dark adaptation of known pathological cases may be charted, as well as the dark adaptation of the patient under test, whereby the patient's chart may be compared with the charts of known pathological cases to ascertain the pathological condition of the patient.

Another object is to provide improved means and method or process for testing eyes to determine the dark adaptation of a patient by means which prevent the patient from deceiving the operator or himself as to when the light is discernable and the position thereof.

Another object is to provide novel means in an instrument of the above character for adjusting and holding the head of the instrument to the height desired.

Another object is to provide a novel construction whereby all of the light producing mechanism as well as the diffusing and other screens are on a single supporting element.

Another object is to provide a novel ventilating system for instruments of the above character.

Another object is to provide a novel voltage control arrangement for a low intensity source of illumination whereby differences in line voltage may be quickly and easily compensated for.

Another object it to provide an instrument whereby the eyes of the person under test may be observed by the examiner during said test.

Another object is to provide a novel means and method for controlling the direction of observation through the sense of touch.

Another object is to provide a novel filter arrangement for controlling the intensity and quality of light used during the test.

Other objects and advantages of the invention will become apparent from the following description taken in connection with the accompanying drawings and it will be apparent that many changes may be made in the details, arrangements and steps of the process shown and described without departing from the spirit of the invention as expressed in the accompanying claims. This invention, therefore, is not limited to such details, arrangements and steps of the method or process shown and described as the preferred forms and steps have only been given by way of illustration.

Referring to the drawings:

Fig. I is a side elevation of a modified form of the invention;

Fig. II is an enlarged top plan view of the instrument shown in Fig. I;

Fig. III is an enlarged front elevation of the instrument illustrated in Fig. I;

Fig. IV is a sectional view taken as on line IV—IV of Fig. III; and

Fig. V is a view of the internal lighting system of the instrument taken as on line V—V of Fig. IV looking in the direction indicated by the arrows.

Instruments for determining night blindness have been made in various forms heretofore, but have been bulky and unwieldy, expensive to manufacture and difficult to properly and accurately control as well as having disadvantages such as variations of the illumination, overheating of light sources or container, light areas of varying intensity, division of parts throughout several supports, difficulty of adjusting relatively heavy instruments for proper height and various other similar difficulties.

The prime object of the invention, therefore, is the provision of new and improved means and method or process for testing eyes to determine dark adaptation in a qualitative manner and to discover the existence and character of associated pathological conditions whereby all of the above difficulties are obviated and compact, simple and efficient means and a more accurate method have been provided.

Referring to the drawings in which similar reference characters represent similar parts throughout:

The method or process in which the means described herein may be used is based on the previous study of some thousands of actual pathological cases whose diseases or ailments have been actually medically determined. After each of these cases had been medically diagnosed, the patient was then subjected to a dark adaptation test as described hereafter, and a curve chart mapped out, showing graphically the characteristic curve for the given pathological condition of the patient. A graphic curve chart was made for each of the said patients of known pathological conditions. A study of these charts indicated that for each similar pathological condition the curve showed a similar characteristic at a certain position on the curve, as for example in cases of glaucoma, there is a characteristic offset at the very start of the curve. Various diseases each have their characteristic effect on the curve as shown by the large number of actual cases known and charted.

Among the various pathological conditions indicated on these charted curves of actual known cases are:

Vitamin A deficiency, sinus infection, glaucoma, arterial sclerosis, endocrinic disturbance, stone in kidney, jaundice, liver troubles, dermatosis, certain blood diseases, post febrile conditions, grippe and colds, temporary illnesses, usually with rise of temperature, pregnancy after six months, etc.

These curves are particularly effective in indicating a deficiency in vitamin A, as there is no other effective reliable way known for determining this.

It is clear from the above that if the dark adaptation curve of a patient under test be taken and compared with the previously prepared case charts, the pathological condition of the patient may be determined from the characteristics of his curve chart.

The above is the procedure followed when a determination of pathological conditions is desired.

The process or method is of the highest utility in determining whether a person has night blindness or not. This is of the highest importance to those who have to drive automobiles at night or are engaged in occupations requiring good vision at night. Authorities will probably require that applicants to drive will have to pass a night blindness test. As the license will depend on the result of the test, many might be tempted to deceive the one making the test, by reporting what he knows he should report, rather than what he actually sees. In this invention are provided means and procedures by which this is prevented. By using the apparatus described, the patient has not only to report when the light is seen, but its direction as well. As the directional means are shiftable the patient must report the direction he actually sees or he will be caught up with. In many cases, as is well known, a patient will report what he believes he sees or ought to report, rather than what he actually sees. This is a psychology that makes many forms of subjective eye testing so difficult. The directional means forces the patient to concentrate on what he actually sees and so report it. If he guesses he is caught up with. This provision of anti-cheating means is of great importance and is a novel feature of the invention.

In testing for night blindness qualitatively I preferably use the device as shown in the drawings which comprises a housing 3 having light sources 40 therein of relatively high intensity and a light screen 16 through which the source of light 40 is viewed. The housing 3 is provided with a compartment having a dim light source 43 therein and light screens 27 and 28 through which the dim light source is to be viewed. A suitable daylight filter 37 is positioned between the dim light source 43 and screen 27. The dim light source 43 is discernible through a slit 32 formed in a rotatable collar member 35 which enables the slit to be moved in different directions.

The test is performed by first turning on the bright light 40 and having the patient look at said light for a given period of time, depending upon the intensity of said light 40.

This light source is preferably for the purpose of bleaching out the visual purple in the eye. During the viewing of said bright light the dimmer light 43 is turned on and the slit 32 set in a desired direction. The bright light 40 is then turned off and the time it takes the patient to discern the dim light 43, which of course is of a predetermined controlled intensity, is noted and attention is also given to the reported direction at which the slit is positioned. This varying of the position of the slit provides an anti-cheater device so that the accuracy of the patient's statements may be checked.

If the patient discerns the light 43 and the direction of the light slit 32 in a determined time, say within five minutes, it is known from experience and experimentation that the patient has normal light adaptation. If his time is beyond this limit it is known that the patient has night blindness and he is referred to further test, and a chart is made of his curve so as to ascertain his pathological condition, or he may be referred to medical examination by qualified medical practitioners. Those that show normal dark adaptation may be passed or licensed to drive or perform other occupations requiring good night vision.

The instrument illustrated in Fig. I comprises a hollow base 1 having a support 2 for the head 3 of the instrument in telescoped relation therewith. The upper end of the hollow base 1 is provided with a shouldered sleeve member 4 having a tapered recess 5. The shouldered portion of the sleeve 4 is provided with threads 6.

Surrounding the support 2 is provided a plurality of wedge members 7 retained in assembled relation with each other by a coil spring 8. The wedge members are adapted to freely engage the support 2 through the resilient action of the coil spring 8. When the head of the instrument responds to the action of gravity, the wedge members 7 engage with the tapered recess of the sleeve 4 and automatically grip the support 2 to retain it in adjusted position. When the support 2 is moved in a direction opposite the direction of gravity, the wedge members are moved upwardly free from the tapered recess 5 and allow the support 2 to slide freely in an upward direction.

If it is desired to positively clamp the support 2 in an adjusted position, a nut 9 having an upper bearing wall 10 thereon is threaded downwardly on the threaded portion 6 of the sleeve 4 and forces the wedge members downwardly into binding relation with the tapered wall 5 and with the side walls of the support 2.

The lower end of the hollow base 1 is provided with a flange 11 on which a rubber cushion ring 12 is reained by its own elasticity.

The head of the instrument 3 comprises a casing 13 secured to the support 2 by a pin connection 14. The casing 13 is provided with a hollow stud projection in which the support 2 extends. This support 2 is secured in the hollow stud by the pin member or the like 14.

The casing 13 has a window opening 15 therein in which is supported a diffusing screen 16. This screen may be of any translucent material as opal glass, opaline, Celluloid, or any suitable means. The screen 16 engages a shoulder 17 surrounding the window opening 15 and is retained thereon by a framing member 18, preferably formed of relatively thin sheet-like material. The framing member 18 is retained in position by means of bolts or the like 19. This framing member not only supports the diffusing screen 16 in desired position, but also provides means for supporting the visor 20. The visor 20 is preferably formed of Bakelite, but may be formed of other desired materials and is provided with connection bolts 21, the heads 22 of which are adapted to grip the edge of the framing member 18 through sliding connection therewith and thereby hold the visor 20 in position on the instrument. The bolts 21 are provided with a spring washer 23 which allows the heads 22 to resiliently grip the edge portion of the framing member 18.

The casing 13 is provided with an opening 24 directly below the window opening 15. The opening 24 rotatably supports a sleeve member 25 which is retained therein by means of a threaded nut 26. The sleeve member 25 has mounted therein spaced translucent screens 27 and 28. These screens are held in spaced relation with each other by an internal tubular member 29. The inner surface of the tubular member 29 is provided with a light diffusing surface coating. The forward end of the sleeve 25 is provided with an inwardly deflected shoulder 30 against which the translucent screen 28 rests. Immediately in front of the translucent screen 28 is positioned an opaque disc 31 having a transversely extending slot 32 therein. In front of said disc 31 is positioned a protection layer of glass 33. The glass 33 and disc 31 are held in position by a spring retaining ring 34. This retaining ring is merely snapped into position.

The disc 31 and protection layer of glass 33 are supported by said resilient ring member 34 in a collar 35 rotatably supported on the forward end of the sleeve member 25. The collar is held on the end of the sleeve through the provision of a circumferential groove in the outer surface of the sleeve 25 and suitable resilient fixation indents 36 positioned within said circumferential groove. This allows the transverse slot 32 in the opaque disc to be moved to different meridinal positions.

In the rear of the diffusing screen 27 is positioned a blue grass filter 37. The said filter, together with the diffusing screen 27 is retained in butted relation with the adjacent end of the internal tubular member 29 by means of a spring retaining ring 38.

The casing 13 is provided with a rear plate 39 which is secured to the casing by means of screws or the like not shown. The plate 39 supports a pair of high intensity sources of illumination 40 and a reflector 41 which is positioned immediately in the rear of said sources of illumination, see Fig. V.

The sources of illumination are interchangeably supported in suitable sockets 42 carried by said plate 39.

The plate 39 also supports a low intensity source of illumination 43.

The high intensity sources of illumination 40 are directly in the rear of the diffusing screen 16, while the low intensity source of illumination is directly in the rear of the diffusing screen 27.

The plate 39 is provided with an opening in alignment with the low intensity source of illumination in which a brilliant 44 is supported to provide a telltale member to determine whether or not the low intensity source of illumination is lit.

The high intensity sources of illumination are connected through the lead wires 45 to an adapter 46 having a plug connection 47 with a suitable source of electrical energy. In the line 48, connecting the plug 47 to the adapter, there is provided a suitable switch 49 by means of which the current may be turned on or off.

The low intensity source of illumination is also connected to the adapter 46 by means of lead wires 50 which connect said adapter with a resistance unit 51. The resistance unit 51 has a plurality of taps 52 at different points longitudinally thereof which introduce a different amount of resistance at each tap. The taps are connected through the lead wires 53 to a selector switch 54. The selector switch may be set to accommodate for a line voltage of 110 volts, 115 or 120. A suitable indicator 55 and indication means 56 are provided for indicating where the selector is set.

The object of this resistance member 51 and selector 54 is to compensate for different line voltages in different localities and is adapted to complete the circuit to the low intensity source of illumination and maintain the said low intensity source of illumination at the desired intensity. A suitable resistance unit 57 is placed in the line circuit for the high intensity sources of illumination.

The casing 13, as illustrated in Fig. V, is provided with suitable vent openings 58, allowing circulation of cool air upwardly internally of the casing 13. The cool air entering the casing 13 through the vent openings 58 is adapted to circulate about the low and high intensity sources of illumination and then passes outwardly of the vent opening 59 provided at the top of the instrument. The vent opening 59 is formed by spacing the upper wall of the casing 13 from an inwardly deflected lip 60 on the plate 39.

The switch 49 is adapted to turn on or off the separate sources of illumination simultaneously.

It is particularly pointed out that when the switch 49 closes the circuit to the sources of illumination 40 and 43, both the said sources are illuminated. An additional switch 61 is provided whereby the high intensity sources of illumination 40 may be shut off independently of the low intensity source of illumination 43.

The front of the instrument, as illustrated in Fig. III, is provided with feeler members 62 with which, during the use of the instrument, the patient is asked to engage one of his fingers. If the patient is right handed, the feeler member 62 on the right hand side is engaged. If the patient is left handed, the feeler member 62 on the left hand side is engaged. It is to be understood that, if desired, either hand may be placed on either feeler, or either hand on any other desired locating device or in any desired direction. The patient is requested to hold his finger in engagement with the feeler member 62 during the test. The object of this arrangement is to provide means which, after the patient has viewed the high intensity of illumination for a given period and the said high intensity source is turned off, will provide means whereby the patient can determine where to look. It is assumed that the patient has been viewing the high intensity source of illumination and the said source has been turned off. During this time it is impossible for the patient to discern anything visibly. To direct the patient where to look, he is told to concentrate in the direction indicated by his finger. This normally automatically causes the patient to look in the direction of the low intensity source of illumination.

The operation of the instrument is substantially as follows:

The patient is positioned relatively close to the window opening 15, that is, directly in front of the diffusing screen 16. The high intensity sources of illumination 40 are turned on and the patient is caused to view the high intensity sources of illumination for a period sufficient to bleach out the visual purple of the eyes. The high intensity sources of illumination are then turned off and the patient is asked to move his head backward an indicated amount and to look in the direction indicated by his finger. During this time the low intensity source of illumination is turned on and the time interval between the shutting off of the high intensity sources of illumination and the patient's report of the low intensity source of illumination, determines the extent of night blindness.

The visor 20 is cut away, as illustrated in Fig. II along the line 63, so that the observer, as illustrated at 64 in Fig. I, may constantly view the patient's eyes, 65, during the test. This is to insure that the patient is keeping his eyes open during the test, because if the patient should shut his eyes, the test would not be accurate.

The longitudinal opening 32 is rotated to different positions so that the patient must report the direction of said opening when he reports vision of the low intensity source of illumination and provides means whereby the examiner may directly determine the accurateness of the patient's report.

The plate 39 is provided with a tubular housing 66 surrounding the low intensity source of illumination 43. The inner end of the sleeve 25 fits over the adjacent end of the housing 66 so to to provide a separate compartment in which the low intensity source of illumination is contained. This arrangement causes the high intensity sources of illumination to be likewise contained in a separately functioning compartment.

The screens in front of the various sources of illumination are adapted to produce a relatively even curtain of light and are controlled in density as to function in cooperative relation with the intensity of each particular source of illumination so as to produce the resultant intensity desired.

The high intensity source of illumination is such that within a given period it bleaches out the visual purple of the eyes and the low source of illumination is such that, for a normal patient under test, it will be visible after a given period of recovery. These values and time intervals are carefully controlled in the designing of the instrument so as to produce the results desired, that is, to provide positive foundation information to work from.

From the foregoing, it is clear that novel and useful means and methods or processes have been provided for carrying out and obtaining all of the objects and advantages of the invention, in a simple, direct and inexpensive manner, and in a way to avoid error and to insure accuracy of test and findings.

The size and position of the target and the fixation of the patient can be arranged so that any specific area of the retina can be investigated. The fixation is determined by the directed finger position of the patient, who, by means of his kinesthetic sense, can fixate his invisible finger. This is to shift the investigation to various areas and is accomplished by the examiner moving the hand of the patient so as to position his finger in different directions and by asking the patient to look in the direction at which his finger is positioned.

In the use of the apparatus described for making the dark adaptation tests, I have so arranged the apparatus that the one making the test can look into the patient's eyes at all times, and hence observe if the eyes are closed at any time and the direction in which they are looking. This is made possible by the light from the instrument since the examiner is not subjected to the high intensity source of illumination directly and can, therefore, readily see the patient's eyes at all times. It is important that the patient should not close his eyes as such suppression will cause an error in the test. The patient is instructed to indicate by his hand when he first sees the second light, and is asked the direction of the light indicator, or he may indicate by other means.

A novel feature of my invention is the use of two lights, the bright light first, and then the secondary light. The apparatus may be so arranged that when the bright light is shut off, the secondary light is automatically tured on. A red telltale light, 44, not visible to the patient, is arranged to indicate whether or not the secondary light is on or off.

In making the test for dark adaptation no medication, drops or other medical treatment is necessary. The complete test may be made with the apparatus described without other preparation of the patient. The tests are made in the dark.

Various time exposures and intervals may be used in conducting the above described tests, but it has been found, from experince, that a three-minute exposure to the bright light gives good results, that if the secondary light is discerned in five minutes after the bright light is turned off, the patient has normal dark adaptation, and, if over that time, he has abnormal dark adaptation. It has been found that three-minute intervals for thirty minutes give splendid results. It is to be understood, that it may be necessary to turn the secondary light on previous to shutting off the bright light, to give it time to attain its normal brilliance and steadiness.

Having described the invention, the claims are as follows:

1. In a device of the character described, a main housing comprising a relatively large light chamber having a high intensity source of illumination therein and an observation opening in a side wall thereof, a light diffusing screen in said observation opening, said wall of the main housing having an additional opening communicating with a relatively small housing internally of said main housing, said small housing having an open end, a low intensity source of illumination in said small housing and a hollow member extending within the additional opening and having its inner end overlying the open end of the relatively small housing, said hollow member being rotatably mounted in said additional opening and having filter means and light diffusing means therein and means for preventing emanation of light from a portion of said light diffusing means while permitting emanation of light from another portion thereof and adapted to produce form character by said emitted light with said form character being rotatable to different given directional positions through rotation of the hollow member.

2. In a device of the character described, a main housing comprising a relatively large light chamber having a high intensity source of illumination therein and an observation opening in a side wall thereof, a light diffusing screen in said observation opening, said wall of the main housing having an additional opening communicating with a relatively small housing internally of said main housing, said small housing having an open end, a low intensity source of illumination in said small housing and a hollow member extending within the additional opening and having its inner end overlying the open end of the relatively small housing, said hollow member being rotatably mounted in said additional opening and having filter means and light diffusing means therein and means for preventing emanation of light from a portion of said light diffusing means while permitting emanation of light from another portion thereof and adapted to produce form character by said emitted light with said form character being rotatable to different given directional positions through rotation of the hollow member, and means for selectively turning on or shunting off different sources of illumination.

3. In a device of the character described, a main housing comprising a relatively large light chamber having a high intensity source of illumination therein and an observation opening in a side wall thereof, a light diffusing screen in said observation opening, said wall of the main housing having an additional opening communicating with a relatively small housing internally of said main housing, said small housing having an open end, a low intensity source of illumination in said small housing and a hollow member extending within the additional opening and having its inner end overlying the open end of the relatively small housing, said hollow member being rotatably mounted in said additional opening and having filter means and light diffusing means therein and means for preventing emanation of light from a portion of said light diffusing means while permitting emanation of light from another portion thereof and adapted to produce form character by said emitted light with said form character being rotatable to different given directional positions through rotation of the hollow member and feeler means on said main housing adjacent the hollow member adapted to be engaged by a finger of the person observing said high and low intensity sources of diffused light so located relative to said hollow member that when the person is looking in the direction of said feeler member engaged by the finger the light emanating from said hollow member will lie within the field of vision.

4. In a device of the character described, a main housing comprising a relatively large light chamber having a high intensity source of illumination therein and an observation opening in a side wall thereof, a light diffusing screen in said observation opening, said wall of the main housing having an additional opening communicating with a relatively small housing internally of said main housing, said small housing having an open end, a low intensity source of illumination in said small housing and a hollow member extending within the additional opening and having its inner end overlying the open end of the relatively small housing, said hollow member being rotatably mounted in said additional opening and having filter means and light diffusing means therein and means for preventing emanation of light from a portion of said light diffusing means while permitting emanation of light from another portion thereof and adapted to produce form character by said emitted light with said form character being rotatable to different given directional positions through rotation of the hollow member and means for selectively changing the line voltage on the filament of said low intensity source of illumination according to the variation of the line voltage of the main source of electrical energy from a predetermined voltage so as to maintain substantially constant voltage on said low intensity source of illumination.

5. In a device of the character described, a housing having a relatively large portion forming a relatively large light chamber and a portion of a width less than the large portion having a relatively small light chamber therein separated from said large light chamber by a wall portion, said relatively large light chamber having a high intensity source of illumination therein and the small chamber a low intensity source of illumination therein, said portion of a width less than the large portion having air inlets adjacent to and on the opposed sides of said relatively small light chamber having the inlet openings thereof disposed in a downward direction to direct air about the opposed sides of said small chamber and communicating on the opposed sides thereof with the interior of the relatively large light chamber with said relatively large light chamber having an air outlet opening adjacent the top thereof whereby air entering said inlet openings will circulate about the relatively small light chamber through the interior of the relatively large light chamber and outwardly of the outlet opening adjacent the top of said large light chamber to produce a cooling effect in said light chambers.

6. In a device of the character described a housing having two separately functioning chambers therein, screen means on a common side of said respective chambers, one of said chambers having a relatively high intensity source of illumination therein and the other of said chambers having a relatively low intensity source of illumination therein, circuit lines connecting said relatively high and relatively low intensity source of illumination with a source of electrical energy, means in said circuit lines to said respective sources of illumination for turning on and off said sources of illumination as desired, a resistance unit in the circuit line to said relatively low intensity source of illumination having a plurality of taps at different points longitudinally thereof which introduce a different given amount of resistance at each tap to cause the output line flow to the lamp of each of said taps for different given line voltages to be substantially the same and a selector switch in said line circuit for selective association with each of said taps for selectively directing the line flow through said selective taps according to the line voltage of said main source of electrical energy.

7. In a device of the character described a housing having separate chambers therein, each of said chambers having screen means on a common side thereof, a source of high intensity illumination in one of said chambers and a source of low intensity illumination in the other of said chambers, said housing, on the chamber having the low intensity source of illumination therein, having means distinguishable by the sense of touch and constituting feeler type finger engagement means adapted to be engaged by the finger of an individual being treated by said device and being so positioned relative to said low intensity source of illumination that when said individual is asked to look in the direction of the finger engaging said finger engagement means the low intensity source of illumination will lie within the field of vision of the eyes of said individual.

8. In a device of the character described a housing having separate chambers therein, each of said chambers having screen means on a common side thereof, a source of high intensity illumination in one of said chambers and a source of low intensity illumination in the other of said chambers, said housing, on the chamber having the low intensity source of illumination therein, having protruding feeler type finger engagement means adapted to be engaged by the finger of an individual being treated by said device and being so positioned relative to said low intensity source of illumination that when said individual is asked to look in the direction of the finger engaging said protruding finger engagement means the low intensity source of illumination will lie within the field of vision of the eyes of said individual.

WILLIAM F. PECK.
CHARLES M. SPERAZZ.